US007055145B2

(12) United States Patent
Hatalkar

(10) Patent No.: US 7,055,145 B2
(45) Date of Patent: May 30, 2006

(54) DYNAMIC MANAGEMENT OF EXECUTE IN PLACE APPLICATIONS

(75) Inventor: Atul N. Hatalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 718 days.

(21) Appl. No.: 10/283,997

(22) Filed: Oct. 30, 2002

(65) Prior Publication Data

US 2004/0088701 A1 May 6, 2004

(51) Int. Cl.
*G06F 9/45* (2006.01)

(52) U.S. Cl. ...................... 717/154; 717/162
(58) Field of Classification Search ............... 717/154, 717/162; 710/6
See application file for complete search history.

(56) References Cited

U.S. PATENT DOCUMENTS

| 5,581,768 A * | 12/1996 | Garney et al. ............... 718/104 |
| 6,357,040 B1 * | 3/2002 | Porter ......................... 717/154 |
| 6,775,423 B1 * | 8/2004 | Kulkarni et al. ............. 382/305 |
| 2004/0078509 A1 * | 4/2004 | Malueg et al. ............... 711/100 |

FOREIGN PATENT DOCUMENTS

WO    WO 2004042566 A3 *  2/2005

* cited by examiner

*Primary Examiner*—Tuan Dam
*Assistant Examiner*—Eric B. Kiss
(74) *Attorney, Agent, or Firm*—Schwabe, Williamson & Wyatt, P.C.

(57) ABSTRACT

Briefly, in accordance with one embodiment of the invention, applications may be dynamically reconfigured as execute-in-place applications or non-execute in place applications by monitoring application usage and configuring the applications based on the application usage data. Monitoring of application usage may be continuous, and the application usage data may be updated as application usage changes over time.

40 Claims, 4 Drawing Sheets

DYNAMIC MANAGEMENT OF EXECUTE IN PLACE APPLICATIONS

BACKGROUND

In many computing systems, software modules may be executed "in-place", otherwise known as XIP, for reasons of speed and memory conservation. Most types of embedded devices do not have secondary storage such as a hard disk. Therefore, software modules may be stored in non-volatile primary memory such as read-only memory (ROM) or flash memory. In classical environments such as non XIP-enabled embedded environments, a software module may be copied from a storage location to system random-access memory (RAM) before being executed. In XIP enabled environments, software modules may be executed directly from where they are stored if certain conditions are met.

With XIP technology, software modules typically may be stored in primary memory such as ROM or flash memory. These types of memories may be directly accessible by an execution unit of a central processing unit (CPU) or processor. Another requirement may be that the software modules have fully resolved memory references. Executing a software module in an XIP mode may lead to improved performance when launching the module. Another aspect of XIP is that the device may utilize less RAM space since software modules may be executed directly from ROM or flash memory.

When a software module is configured for XIP, the module may be required to be stored in a "ready to run" state. As a result, typical schemes of storing software modules as a compressed image in ROM or flash memory are generally not suitable for XIP. In general, modules configured for XIP may take up more space in ROM or flash than non-XIP modules that are compressed for storage. As a result, there is a memory size related conflict between XIP and non-XIP schemes. Whereas in non-XIP schemes, compressing the stored module may conserver read-only memory (ROM) or flash memory, the non-XIP schemes may require more RAM to execute the modules as a result. On the other hand, in an XIP scheme, using XIP reduces the need for RAM, however relatively larger ROM or flash memory may be required since software modules need to be stored in a non-compressed mode.

For the above reasons, in a typical device capable of supporting an XIP mode, some software modules are XIP enabled, and other modules are non-XIP enabled. The decision whether a module is XIP or non-XIP typically may be made at the device build-time. After the device is built and deployed, the software modules generally cannot be switched between XIP and non-XIP modes.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
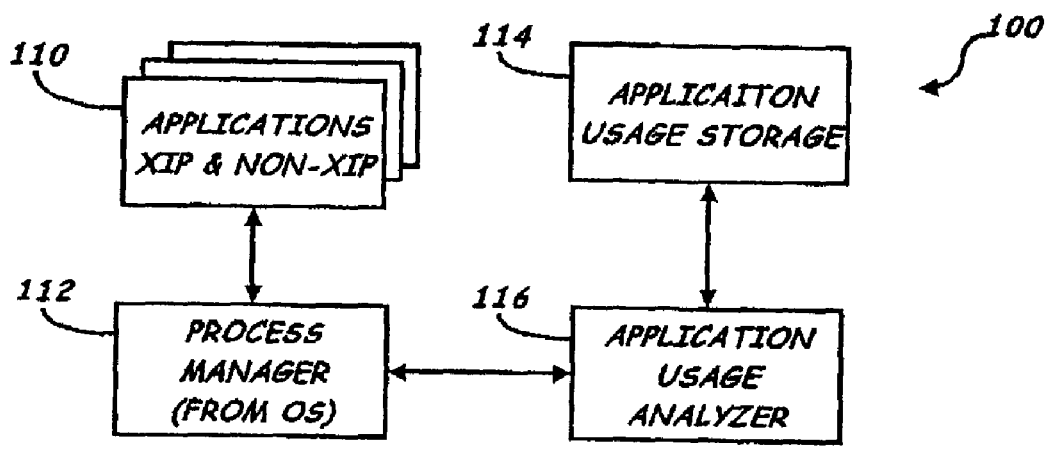
FIG. 1 is a diagram of an application usage analyzer system for a method to manage XIP applications in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

Figure 2:
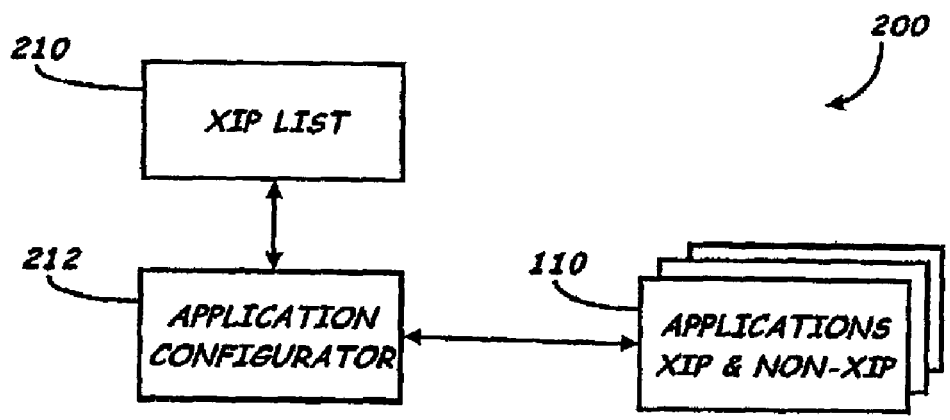
FIG. 2 is a diagram of an application configurator system for a method to manage XIP applications in accordance with an embodiment of the present invention.

Referring now to FIGS. 1 and 2, an example XIP management scheme in accordance with an embodiment of the present invention will be discussed. In an example XIP memory management scheme, XIP management may be implemented by two primary modules, an application usage analyzer module 116, as shown in FIG. 1, and an application configurator module 212, as shown in FIG. 2. The application usage analyzer module 116 and the application configurator module 212 may be implemented as part of an operating system (OS) and may use the system registry of the OS for data and storage needs. It should be noted that the modules shown in the drawing figures throughout the specification may be in one embodiment of the invention software modules capable of adapting a processor to execute one or more of the functions associated with the modules. In such an embodiment, the modules may adapt a general purpose processor to be a specific and tangible structure capable of executing one or more functions of the module, although the scope of the invention is not limited in this respect.

Application usage analyzer module 116 as shown in FIG. 1 may work closely with a process manager module 112 of the operating system to gather information about each of the applications 110, both XIP and non-XIP applications, as an application is started and stopped by a user. For example, the information collected by application usage analyzer 116 may be the number of times an application was utilized, and the duration for which it was used. The usage information may be compiled and stored in application usage storage 114, although the scope of the invention is not limited in this respect.

Application usage analyzer 116 may continue to capture data for a predetermined analysis period. The predetermined analysis period may be adjustable or configurable by the user. The predetermined analysis period may also be adjusted by an external entity such as a device management server in a wired or wireless networked environment. At the end of the predetermined analysis period, application usage data may be analyzed using one or more appropriate criteria, which may be defined by the device manufacturer, for example, by the user, or by a service provider coupled to the device. The analysis of the criteria may result in an ordered list of the more frequently used applications. Applications that are more frequently used, or applications with a higher usage time, may be set to operate in an XIP mode so that they may be more readily able to be executed when needed.

If the current set of XIP applications is different than the newly identified set of frequently used applications, the device may reconfigure applications to bring them into a more desired state, for example by changing one or more non-XIP applications to XIP applications, by changing one or more XIP applications to non-XIP applications, or a combination thereof. Application configurator 212 of FIG. 2 may read the XIP list 210 of XIP applications and may make appropriate changes, if needed. If any changes to the list are needed as determined by application usage analyzer 116, application configurator 212 may reconfigure the applications 110 so that one or more XIP applications may be reconfigured as non-XIP applications, and one or more non-XIP applications may be reconfigured as XIP applications. Once applications 110 are configured, a new analysis period may begin, and application configurator 212 may dynamically reconfigure the applications as XIP or non-XIP as desired.

Figure 3:
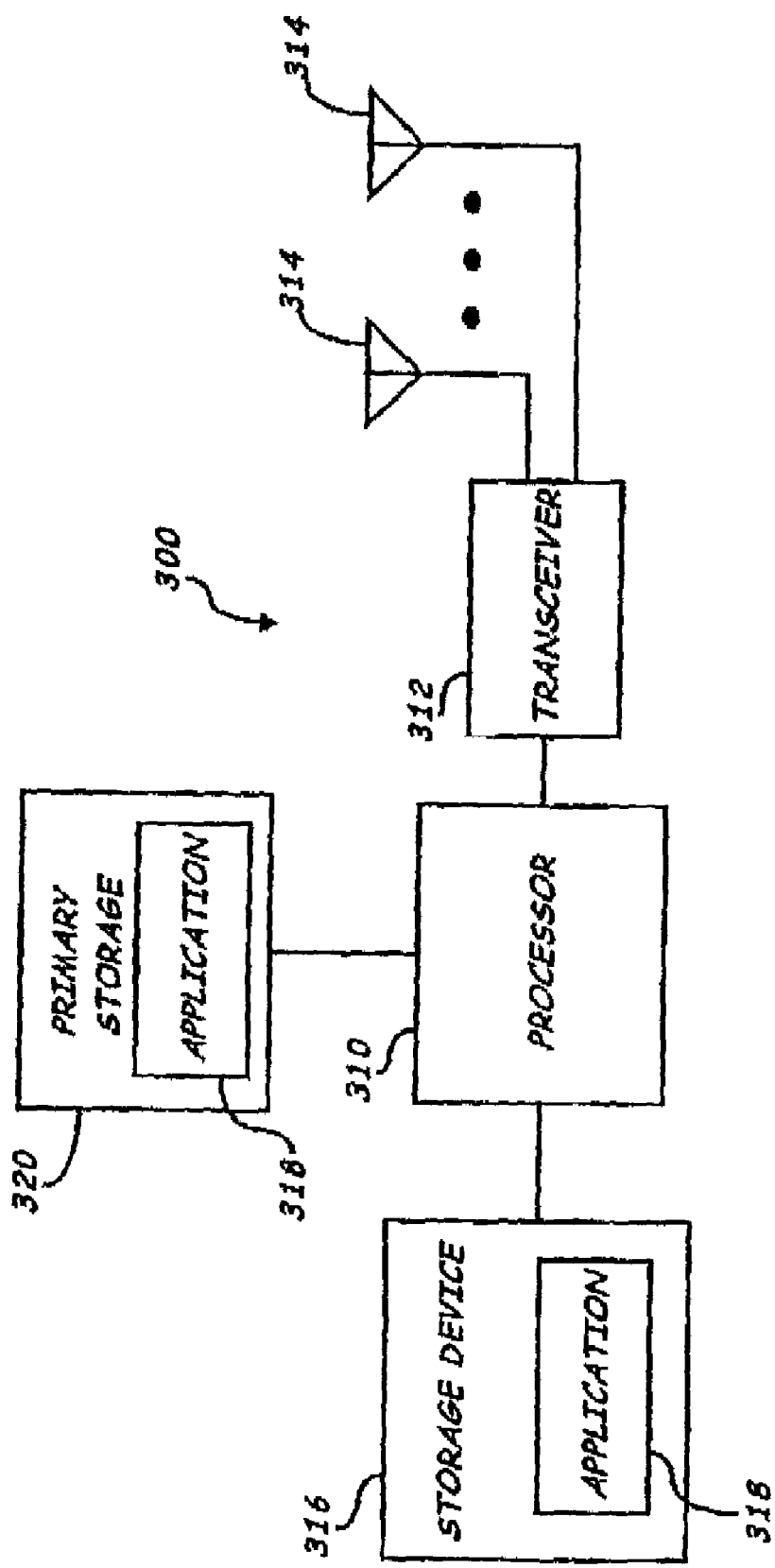
FIG. 3 is a block diagram of a portable device that may be utilized to manage XIP applications in accordance with an embodiment of the present invention.

Referring now to FIG. 3, a block diagram of an example device capable of managing XIP and non-XIP applications in accordance with an embodiment of the present invention will be discussed. Device 300 may include a processor 310 to control the operation of device 300. Processor 310 may include a microprocessor or a controller, although the scope of the present invention is not limited in this respect. An optional transceiver 312, and optionally included one or more antennas 314, may couple with processor 310 so that device 300 may communicate with other devices such as a base station, an access point, other devices, and so on, via a wireless communication link, although the scope of the invention is not limited in this respect. Multiple antennas 314 may be used, for example, to provide multiple channels or modes of communication, or may be used to help identify device 300 from other devices.

In one embodiment of the invention, although not necessarily all, a storage device 316 may couple to processor 310 to store an application 318, and also data or other information. Storage device 316 may include a memory device such as semiconductor memory, for example non-volatile memory such as read-only memory (ROM) or flash memory, a disk drive, a removable storage medium, or the like, although the scope of the invention is not limited in this respect. In one embodiment, device 300 may include a storage device 316 on which an application 318, commands, or data may be stored. In one embodiment, an application, a command, or data may be received from a base station via at least one or more communication links. In one particular embodiment, an application 318 may be an configuration application to configure the operation of device 300. Device 300 may include primary storage 320, for example non-volatile memory such as flash. Application 318 may be stored in primary storage 320 to be executed by processor 310.

In one embodiment, the configuration information may define one or more operating characteristics of device 300, and may include at least a portion of an operating system, protocol stack, or standard application layer. In one embodiment, the configuration information may be a software upgrade that defines one or more features of the portable device. The configuration information may be, for example, retrieved from a database of a remote device or system coupled to device 300 via a base station. In a particular embodiment, application 318 may be an application for establishing communications via an ad-hoc network in accordance with an embodiment of the present invention, although the invention is not limited in this respect.

In one embodiment, device 300 may be transportable by a user, such as a hand held device, and may be operated by a user while being hand held or otherwise on the person of the user, such as in a pocket, attached to a belt or holster, and so on. A base station may allow device 300 to communicate with other devices, and may allow device 300 to communicate via a network. In one embodiment, a network may be a wide area network or worldwide network such as the Internet, although the scope of the present invention is not limited in this respect. As a transportable device, device 300 may be referred to as mobile units (MUs).

In one embodiment, device 300 may be battery operated where the battery serves as a power source during operation, and may alternatively be powered from an external power source such as an ac or dc power source, directly, to charge the battery, or to provide supplemental power to the device, although the scope of the present invention is not limited in this respect. In one embodiment of the invention, device may be configured to operate via a wireless or a cellular network compliant with at least one or more cellular standards, including but not limited to 3rd Generation Partnership Project (3GPP), Wideband Code-Division Multiple Access (WCDMA), Code-Division Multiple Access 2000 (CDMA 2000), Global System for Mobile Communications-General Packet Radio Service (GSM-GPRS), Global System for Mobile Communications-Enhanced General Packet Radio Service (GSM-EGPRS), Institute of Electrical and Electronics Engineers (IEEE) Standards 802.11a, 802.11b, and so on, although the scope of the present invention is not limited in this respect. Other wireless standards may be utilized without departing from the scope of the invention and without providing substantial change thereto.

In one embodiment of the invention, application 318 may include XIP and non-XIP applications 110, process manager 112, application usage analyzer 116, and application configurator 212. Storage device 316 or primary storage 320 may include application usage storage 114 and XIP list 212. Furthermore, applications 110, both XIP and non-XIP, process manager 112, application usage analyzer 116, and application configurator 212 may be executed by processor 310, along with the operating system of device 300. In one embodiment, processor 310 may compress non-XIP applications to be stored in storage device 316, although the scope of the application is not limited in this respect.

Figure 4:
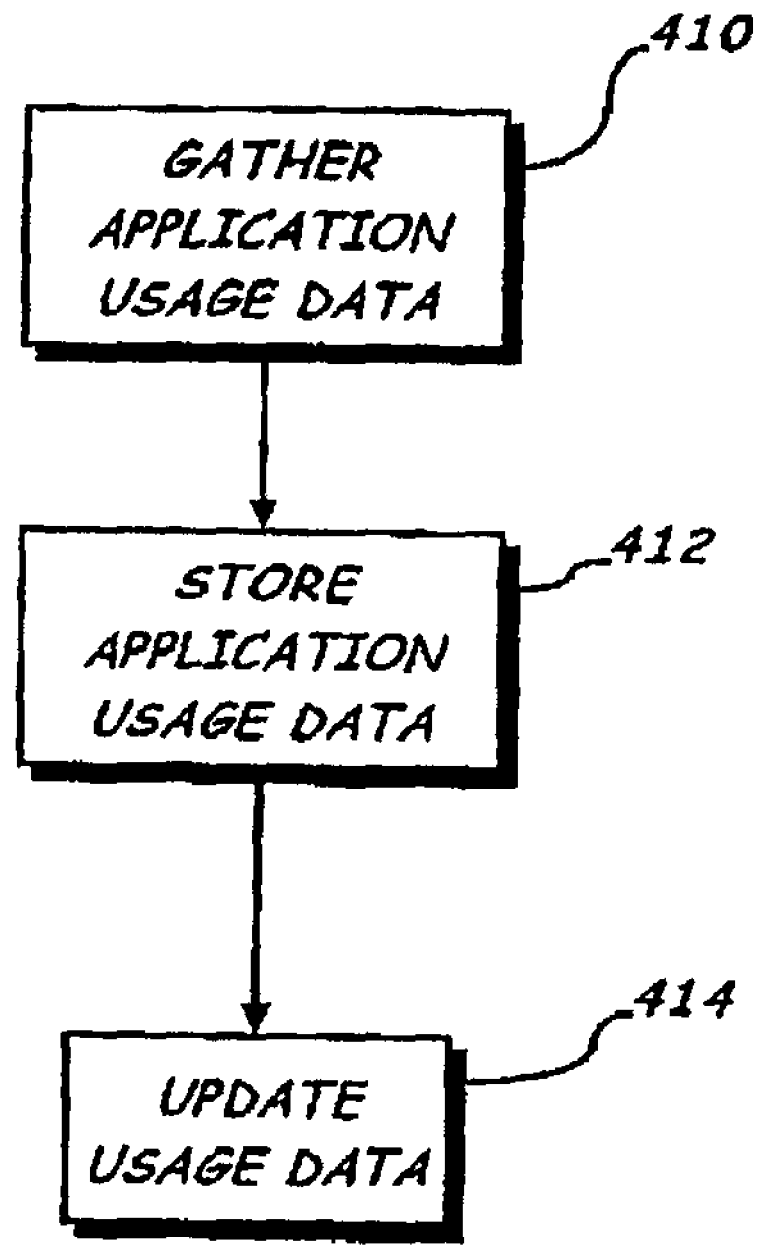
FIG. 4 is a flow diagram of a method to gather application usage data in accordance with an embodiment of the present invention.

Referring now to FIG. 4, a flow diagram of a method to gather application usage data in accordance with an embodiment of the present invention will be discussed. The method may begin at block 410 with the gathering of application usage data. Application usage data may be obtained over time and may continuously occur as a user uses device 300. As device 300 is used, a pattern of application usage may be developed. For example, the frequency with which particular applications are opened and used may be obtained. In addition, the amount of time that particular applications are running over a period of time may also be obtained. As application usage data is gathered, the application usage data may be stored at block 412, for example in application usage storage 114 of FIG. 1. As new application usage data is obtained, application usage data for individual applications may be updated at step 414.

Figure 5:
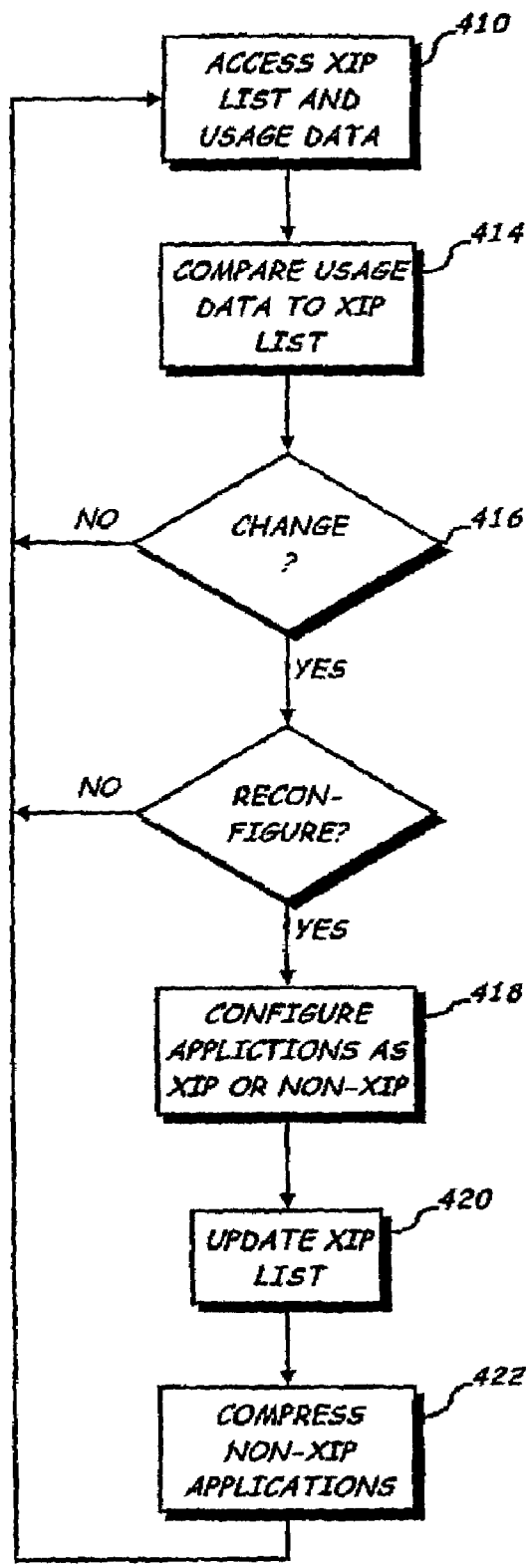
FIG. 5 is a flow diagram of a method to analyze and configure applications in accordance with an embodiment of the present invention.

Referring now to FIG. 5, a flow diagram of a method to analyze and configure applications in accordance with an embodiment of the present invention will be discussed. At block 510, configurator 212 may access XIP list 210 and usage data stored in application usage storage 114. At block 512, Application configurator 212 may then compare usage data as gathered by application usage analyzer 116 to XIP list 210. A determination is made at block 514 whether a change is present in the application usage data as compared to XIP application list. For example, a new application may be determined as the application used for the longest duration over a given usage period. Thus, XIP list 210 may have a first application ranked over a second application based on the first application having a greater total time used than the second application. The updated usage data may indicate a change in the rankings of applications when the second application is used more frequently than the first application. In the event no change in application usage as compared to XIP list is determined, the method may continue with the current XIP list 210 for a subsequent configuration analysis. The configuration analysis method of FIG. 5 may occur periodically, for example once per week, although the scope of the invention is not limited in this respect. The period of configuration analysis may be longer or shorter in duration as desired without departing from the scope of the invention. The frequency with which the configuration analysis is executed may be set by the manufacturer of device 300, by a user, or by a service provider that provides communication services to device 300, although the scope of the invention is not limited in this respect.

If a change is the usage data as compared to XIP list 210 is found, a determination may be made at block 516 whether the change warrants a reconfiguration of applications. If no change is warranted, for example if the usage data indicated that the same number of applications should remain as XIP applications where the order of XIP applications was merely shuffled, then the configuration analysis method may continue for subsequent configuration analysis iterations. In the event it is determined that at least one application should be reconfigured, one or more applications may be configured at block 518. If a non-XIP application is configured as an XIP application, a complete expansion of the application may occur when the application is configured in an XIP mode. If an XIP application is configured as a non-XIP application, the expanded XIP application may be removed from memory. After configuration, XIP list 210 may be updated at block 420, and reconfigured non-XIP applications may be compressed for more compact storage.

In one embodiment of the invention, XIP applications may be stored in primary storage 320, such as flash, and non-XIP applications may be stored in storage device 316, although the scope of the invention is not limited in this respect. In another embodiment, both XIP applications and non-applications may be stored in primary storage 320 where a certain portion of primary storage 320 may be used for XIP applications. XIP list may be based in part on the size of primary storage 320, or based on the size of the portion of primary storage 320 used for XIP applications. For larger sizes of primary storage 320, or for larger portions of primary storage 320 used for XIP applications, XIP list 210 may include more applications configured as XIP applications, although the scope of the invention is not limited in this respect. Likewise, for smaller sizes of primary storage, or for smaller portions of primary storage 320 used for XIP applications may result in XIP list 210 having fewer XIP applications, although the scope of the invention is not limited in this respect.

Although the invention has been described with a certain degree of particularity, it should be recognized that elements thereof may be altered by persons skilled in the art without departing from the spirit and scope of the invention. It is believed that dynamic management of execute-in-place applications of the present invention and many of its attendant advantages will be understood by the forgoing description, and it will be apparent that various changes may be made in the form, construction and configuration of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
   an application usage analyzer to analyze application usage and to store application usage data associated with an application configured as an execute-in-place application or a non-execute-in-place application; and
   an application configurator to reconfigure said application as an execute-in-place application or as a non-execute-in-place application based upon the application usage data.

2. An apparatus as claimed in claim 1, wherein said application usage analyzer is adapted to update the application usage data as applications are used.

3. An apparatus as claimed in claim 1, wherein said application configurator generates a list of execute-in-place configured applications and compares the application usage data to the list of execute-in-place configured applications to determine which applications to configure as an execute-in-place application.

4. An apparatus as claimed in claim 1, wherein said application configurator updates a list of execute-in-place configured applications when applications are reconfigured as execute-in-place applications or non-execute-in-place applications.

5. An apparatus as claimed in claim 1, wherein execute-in-place applications are stored in primary storage, and non-execute-in-place applications are stored in secondary storage.

6. An apparatus as claimed in claim 1, wherein execute-in-place applications are stored in a portion of primary storage used for execute-in-place applications, and non-execute-in-place applications are stored in a portion of primary storage used for non-execute-in-place applications.

7. An apparatus as claimed in claim 1, wherein said application configurator reconfigures an execute-in-place application as a non-execute-in-place application based at least in part upon a reduced usage of the application.

8. An apparatus as claimed in claim 1, wherein said application configurator reconfigures a non-execute-in-place applications as an execute-in-place application based at least in part upon an increased usage of the application.

9. An apparatus as claimed in claim 1, wherein non-execute-in-place applications are stored in a compressed format.

10. A method, comprising:
    gathering application usage data associated with one or more applications configured as either execute-in-place or non-execute-in-place; and
    reconfiguring at least one of said one or more applications as execute-in-place or non-execute-in-place based upon the application usage data.

11. A method as claimed in claim 10, further comprising storing the application usage data.

12. A method as claimed in claim 10, further comprising updating the application usage data as the application usage data changes over time.

13. A method as claimed in claim 10, further comprising updating the application usage data as the application usage data changes over time, and subsequently executing said configuring based upon the updated application usage data.

14. A method as claimed in claim 10, further comprising providing a list of execute-in-place applications, and comparing the list of execute-in-place applications to the application usage data to determine whether applications should be reconfigured, and if so, rearranging one or more applications.

15. A method as claimed in claim 10, further comprising moving an application reconfigured from execute-in-place to non-execute-in-place from primary storage to secondary storage.

16. A method as claimed in claim 10, further comprising moving an application reconfigured from non-execute-in-place to execute-in-place from secondary storage to primary storage.

17. A method as claimed in claim 10, wherein said gathering occurs continuously as applications are used.

18. A method as claimed in claim 10, wherein said configuring occurs at predetermined intervals.

19. A method as claimed in claim 10, wherein said configuring occurs to provide an optimal usage of memory.

20. A method as claimed in claim 10, wherein said configuring occurs based on an amount of memory available to store execute-in-place applications.

21. An article, comprising a storage medium, said storage medium having stored thereon instructions, said instructions, when executed, resulting in configuration of applications as execute-in-place or non-execute-in-place by:
    gathering application usage data associated with one or more applications configured as either execute-in-place or non-execute-in-place; and
    reconfiguring at least one of said one or more applications as execute-in-place or non-execute-in-place based upon the application usage data.

22. An article as claimed in claim 21, said instructions further resulting in storing the application usage data.

23. An article as claimed in claim 21, said instructions further resulting in configuration of applications as execute-in-place or non-execute-in-place by updating the application usage data as the application usage data changes over time.

24. An article as claimed in claim 21, said instructions further resulting in configuration of applications as execute-in-place or non-execute-in-place by updating the application usage data as the application usage data changes over time, and subsequently executing said configuring based upon the updated application usage data.

25. An article as claimed in claim 21, said instructions further resulting in configuration of applications as execute-in-place or non-execute-in-place by providing a list of execute-in-place applications, and comparing the list of execute-in-place applications to the application usage data to determine whether applications should be reconfigured, and if so, rearranging one or more applications.

26. An article as claimed in claim 21, said instructions further resulting in configuration of applications as execute-in-place or non-execute-in-place by moving an application reconfigured from execute-in-place to non-execute-in-place from primary storage to secondary storage.

27. An article as claimed in claim 21, said instructions further resulting in configuration of applications as execute-in-place or non-execute-in-place by moving an application reconfigured from non-execute-in-place to execute-in-place from secondary storage to primary storage.

28. An article as claimed in claim 21, wherein said gathering occurs continuously as applications are used.

29. An article as claimed in claim 21, wherein said configuring occurs at predetermined intervals.

30. An article as claimed in claim 21, wherein said configuring occurs to provide an optimal usage of memory.

31. An article as claimed in claim 21, wherein said configuring occurs based on an amount of memory available to store execute-in-place applications.

32. An apparatus, comprising:
a cellular transceiver;
an application usage analyzer to analyze application usage and to store application usage data associated with an application configured as an execute-in-place application or a non-execute-in-place application; and
an application configurator to reconfigure said application as an execute-in-place application or as a non-execute-in-place application based upon the application usage data.

33. An apparatus as claimed in claim 32, wherein said application usage analyzer updates the application usage data as applications are used.

34. An apparatus as claimed in claim 32, wherein said application configurator generates a list of execute-in-place configured applications and compares the application usage data to the list of execute-in-place configured applications to determine which applications to configure as an execute-in-place application.

35. An apparatus as claimed in claim 32, wherein said application configurator updates a list of execute-in-place configured applications when applications are reconfigured as execute-in-place applications or non-execute-in-place applications.

36. An apparatus as claimed in claim 32, wherein execute-in-place applications are stored in primary storage, and non-execute-in-place applications are stored in secondary storage.

37. An apparatus as claimed in claim 32, wherein execute-in-place applications are stored in a portion of primary storage used for execute-in-place applications, and non-execute-in-place applications are stored in a portion of primary storage used for non-execute-in-place applications.

38. An apparatus as claimed in claim 32, wherein said application configurator reconfigures an execute-in-place application as a non-execute-in-place application based at least in part upon a reduced usage of the application.

39. An apparatus as claimed in claim 32, wherein said application configurator reconfigures a non-execute-in-place applications as an execute-in-place application based at least in part upon an increased usage of the application.

40. An apparatus as claimed in claim 32, wherein non-execute-in-place applications are stored in a compressed format.

* * * * *

UNITED STATES PATENT AND TRADEMARK OFFICE
CERTIFICATE OF CORRECTION

PATENT NO.         : 7,055,145 B2
APPLICATION NO. : 10/283997
DATED              : May 30, 2006
INVENTOR(S)        : Atul N. Natalkar It is certified that error appears in the above-identified patent and that said Letters Patent is hereby corrected as shown below:

Column 5
Line 67, "...XIP list 212..." should read --...XIP list 210...--.

Column 8
Lines 11-12, "...a non-execute-in-place applications..." should read --...a non-execute-in-place application...--.

Column 10
Lines 35-36, "...a non-execute-in-place applications..." should read --...a non-execute-in-place application...--.

Signed and Sealed this

Twenty-eighth Day of April, 2009

JOHN DOLL
*Acting Director of the United States Patent and Trademark Office*